United States Patent [19]

Sakatani et al.

[11] Patent Number: 5,343,897
[45] Date of Patent: * Sep. 6, 1994

[54] PROFILED CROSS-SECTION THREE DIMENSIONAL WOVEN FABRIC

[75] Inventors: Yoshiaki Sakatani; Tetsuya Yamamoto; Shigeru Nishiyama, all of Nagoya; Yoshiharu Jin, Omihachiman, all of Japan

[73] Assignees: Mitsubishi Jukogyo Kabushiki Kaisha, Tokyo; Shikishima Boseki Kabushiki Kaisha, Osaka, both of Japan

[*] Notice: The portion of the term of this patent subsequent to Aug. 17, 2010 has been disclaimed.

[21] Appl. No.: 70,861

[22] Filed: Jun. 3, 1993

Related U.S. Application Data

[60] Division of Ser. No. 802,708, Dec. 6, 1991, Pat. No. 5,236,020, Continuation of Ser. No. 311,251, Feb. 16, 1989, abandoned.

[30] Foreign Application Priority Data

Feb. 29, 1988 [JP] Japan .................. 63-47072

[51] Int. Cl.$^5$ .............................. D03D 3/06
[52] U.S. Cl. .................. 139/384 R; 139/20; 139/175; 139/DIG. 1; 139/35; 428/175
[58] Field of Search ............. 139/384 R, 35, 20, 175, 139/DIG. 1, 11; 428/175

[56] References Cited

U.S. PATENT DOCUMENTS

| | | |
|---|---|---|
| 3,818,951 | 5/1974 | Greenwood . |
| 3,834,424 | 9/1974 | Fukuta et al. . |
| 4,331,723 | 5/1982 | Hamm . |
| 4,671,470 | 6/1987 | Jonas . |
| 4,782,864 | 11/1988 | Abildskov . |
| 4,922,968 | 5/1990 | Bottger et al. . |
| 5,236,020 | 8/1993 | Sakatani et al. ............. 139/384 R |

FOREIGN PATENT DOCUMENTS

| | | |
|---|---|---|
| 0236500 | 9/1987 | European Pat. Off. . |
| 0245533 | 11/1987 | European Pat. Off. . |
| 0056351 | 7/1982 | France . |
| 2602248 | 2/1988 | France . |
| 61-296143 | 12/1986 | Japan . |
| 62-79900 | 5/1987 | Japan . |
| 64-75226 | 3/1989 | Japan . |

Primary Examiner—Andrew M. Falik
Attorney, Agent, or Firm—Nikaido, Marmelstein, Murray & Oram

[57] ABSTRACT

A profiled cross-section three-dimensional woven fabric having a plurality of woven, mutually intersecting filaments woven in longitudinal, transverse and vertical planes, with transverse planes of different widths and vertical planes of different height within a cross-section of the woven fabric perpendicular to the longitudinal woven filament planes. The woven filament in the transverse planes moving upward or downward while transversely reciprocating over a width which changes with the width of the woven filaments in each longitudinal woven plane and being disposed between vertically adjacent planes of longitudinal filaments. The woven filaments in the vertical planes moving longitudinally to the height of disposition of the longitudinal and transverse filaments in a plane perpendicular to the transverse filaments and being continuously disposed between longitudinally adjacent layers of transverse filaments, clamping the transverse and longitudinal filaments to unite them together. An even number of transverse filaments are inserted into at least one each transversely elongated transverse space surrounded by vertically adjacent vertical filaments with one or a plurality of the transverse filaments inserted into each loop formed by adjacent vertical filaments above the longitudinal filaments in the uppermost layer and below the longitudinal filaments in the lowermost layer.

7 Claims, 11 Drawing Sheets

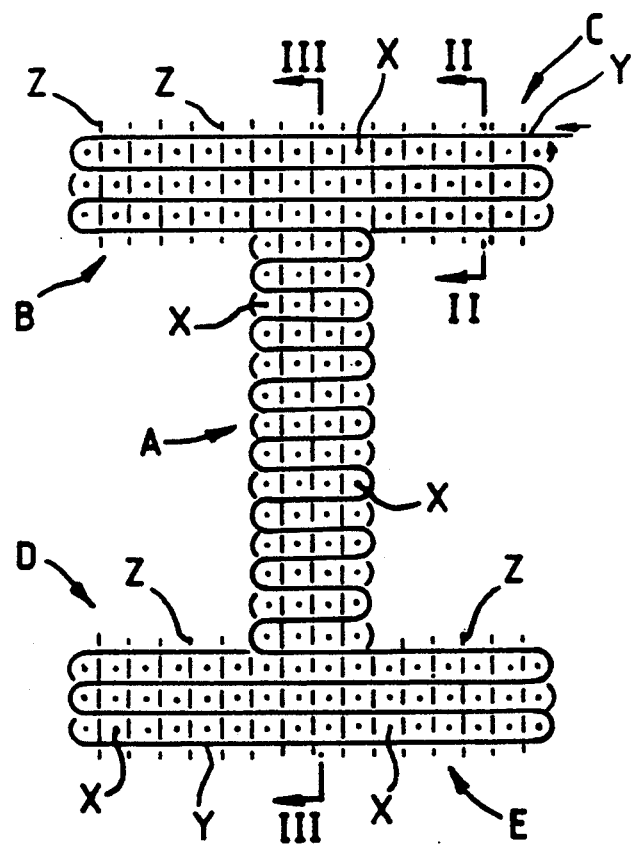
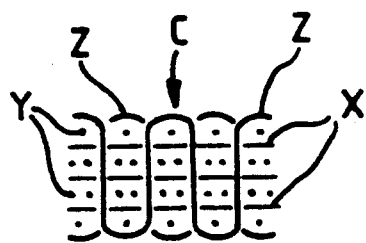
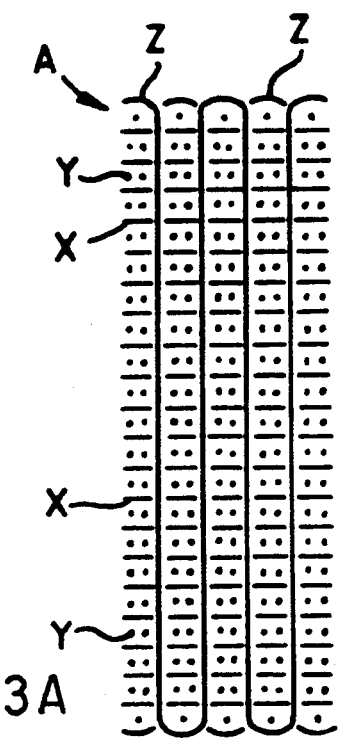
FIG.1A
FIG.2A
FIG.3A

PROFILED CROSS-SECTION THREE DIMENSIONAL WOVEN FABRIC

This is a divisional of application Ser. No. 07/802,708 filed Dec. 6, 1991 now U.S. Pat. No. 5,236,020, a continuation of application Ser. No. 07/311,251 filed Feb. 16, 1989, now abandoned.

BACKGROUND OF THE INVENTION

1. Field of the Invention

This invention relates to a profiled cross-section three-dimensional woven fabric, such as a woven fabric having an I-shaped, T-shaped, L-shaped, U-shaped, or otherwise shaped, cross-section, and providing a textile structure suitable for use as a fiber-reinforced composite material such as fiber-reinforced plastic composite material or a woven fabric, three-dimensional structure, such as shown in FIGS. 4 and 7 hereof, for use as an insert core or piece for insertion in a void formed at a portion where laminated webs bend in an I or inverted T-shaped beam fabricated from laminated webs such as shown in U.S. Pat. No. 4,331,723 and Japanese patent laid open application No. 64-75266.

2. Description of Related Art

Japanese Utility Model Application Laid-Open Specification No. Showa 62-79900 shows a three-dimensional woven fabric having a profiled cross-section which comprises intersecting longitudinal, transverse and vertical woven filaments. FIG. 8 of the present application is a cross-sectional view showing an example of such known three-dimensional woven fabric, wherein a number of filaments X are longitudinally disposed in horizontal and vertical parallel planes of differing width to form an I-shape configuration. One transverse filament Y moves upward while transversely reciprocating over a range which varies in conformance with the width of the planes of longitudinal filaments X, until it passes over the upper most plane of longitudinal filaments X and then moves downward while transversely reciprocating in conformance with the planes of the longitudinal filaments X. Such movement is repeated to continuously dispose planes of the transverse horizontal filament Y between vertically adjacent planes of longitudinal filaments X and passes over the outer most ends of the horizontal filament X planes. On the other hand, a vertical filament Z moves longitudinally while vertically reciprocating in a plane perpendicular to the transverse horizontal filament Y over a range corresponding to the height of the various planes of the longitudinal filaments X and the lengths of the planes of the transverse filaments Y, and is continuously disposed between longitudinally planes formed by the Y filaments in adjacent Y filament horizontal planes. The transverse horizontal filaments Y and longitudinal filaments X are tightened together.

In the three-dimensional woven fabric of such Japanese Utility Model Application '900 as shown in FIG. 8A, the vertical filament Z is continuously disposed between longitudinally planes formed by the Y filaments in adjacent Y filament horizontal planes, and transverse and vertical filaments Y and Z are disposed alternately along one longitudinal filament X. Thus, when the transverse filament Y, as shown in FIG. 8, reaches the end of the horizontal filament X plane, and turns to the back of the paper of FIG. 8, i.e., follows the same course, but in the reverse direction, a gap 1 between adjacent horizontal planes of X filaments is left at the opposite sides of the woven three-dimensional fabric. Hence, an unsymmetrical cross-section is formed. Thus, there are formed longitudinal grooves (gaps) 1 at the upper left and lower right end edges of the three-dimensional woven unit where a longitudinal filament X and a loop of transverse filament Y surrounding the same are missing. This raises a problem that, when the structure is impregnated with a synthetic resin to manufacture a fiber-reinforced composite material, the longitudinal gaps 1 form resin reservoirs which cause microcracks.

Further, when the transverse filament Y reaching the upper end, while transversely reciprocating, is turned to the back of the paper, as shown in FIGS. 9 and 10, and returns to the lower side of the longitudinal filaments X, then there are formed transverse grooves (gaps) 2, FIG. 10, in the upper and lower surfaces which, when the structure is impregnated with resin, form resin reservoirs which also causes microcracks.

Conventionally, when the transverse filament Y is turned at transversely opposite ends, it wraps around the longitudinal filament X leaving the longitudinal filament X intermediate above the wrapped filament X free. Thus, as shown in FIG. 11, the region which is narrow, because of the free X filament, is vertically elongated by tension on the transverse filament Y, upsetting the texture of the woven fabric.

In this invention, a three-dimensional profiled cross-section woven fabric is provided, which is easy to weave without forming longitudinal and transverse grooves, such as grooves 1 and 2 in the prior art of FIGS. 8–11. Furthermore, this invention also provides a three-dimensional woven fabric construction for reinforcing portions which are narrow.

SUMMARY OF THE INVENTION

In the instant invention, the number of transverse and vertical filaments Y and Z disposed along one longitudinal filament X is such that above the longitudinal filaments in the uppermost X filament planes and below the longitudinal filaments X in the lowermost X filament plane, the filaments Y and Z, each as single filaments or plural filaments, alternate with each other, such that, in the other portions, an even number of transverse filaments Y and one vertical filament Z alternate with each other. The three dimensional woven fabric of this invention has a profiled cross section and is characterized by having an even number of transverse filaments included in at least one each transverse plane between corresponding longitudinal planes, and wherein at least one of the transverse filaments is included in a loop which is formed by adjacent vertical filaments above the longitudinal filaments in the uppermost longitudinal plane, and below the longitudinal filaments in the lowermost longitudinal plane.

The fabric is woven by successively shedding, one layer after another. Starting from the upper layer, longitudinal filaments are disposed in locally transversely differing heights, or planes, and the transverse filament is inserted into a shed by a shuttle, alternately from opposite sides. One layer after another is shedded from the lower layer, or plane, and when the lowermost layer or plane is reached, the transverse filament is inserted into the same shed but in the opposite direction.

For the vertical filament, a separate shedding motion is effected for each portion of longitudinal filaments differing in height from the immediately preceding portions. Each time the transverse filament makes one vertical reciprocating movement, while moving in zigzags, upper and lower positions are exchanged so that weaving proceeds. In addition, depending upon the shape of the cubic woven fabric, instead of effecting beating motion, it is possible to use a beating bar, as described in Japanese Patent Application Laid-Open Specification No. 296143/1986, thereby effecting beating motion each time the second transverse filament is inserted into a single shed, and exchanging the upper and lower positions of vertical filaments. A clamping bar is then inserted between the vertical and longitudinal filaments and is advanced to the front of the fell for clamping. A woven fabric of high density can be obtained.

By disposing a locking filament adapted to be shed by a heald wire on one transverse side, inserting the transverse filament from the side opposite to the locking filament, with the locking filament disposed below the shed, and moving the locking filament, alone, above the shed so as to insert the transverse filament into the same shed in its turned state, it is possible, in a further embodiment of the invention, to insert two transverse filaments into each shed and wrap the transverse filaments around the locking filament.

BRIEF DESCRIPTION OF THE DRAWINGS

FIG. 1A is a cross-sectional view of an embodiment of this invention;

FIG. 2A is a sectional view taken along the line II—II in FIG. 1A;

FIG. 3A is a sectional view taken along the line III—III in FIG. 1A;

DESCRIPTION OF PREFERRED EMBODIMENTS

Figure 1B:
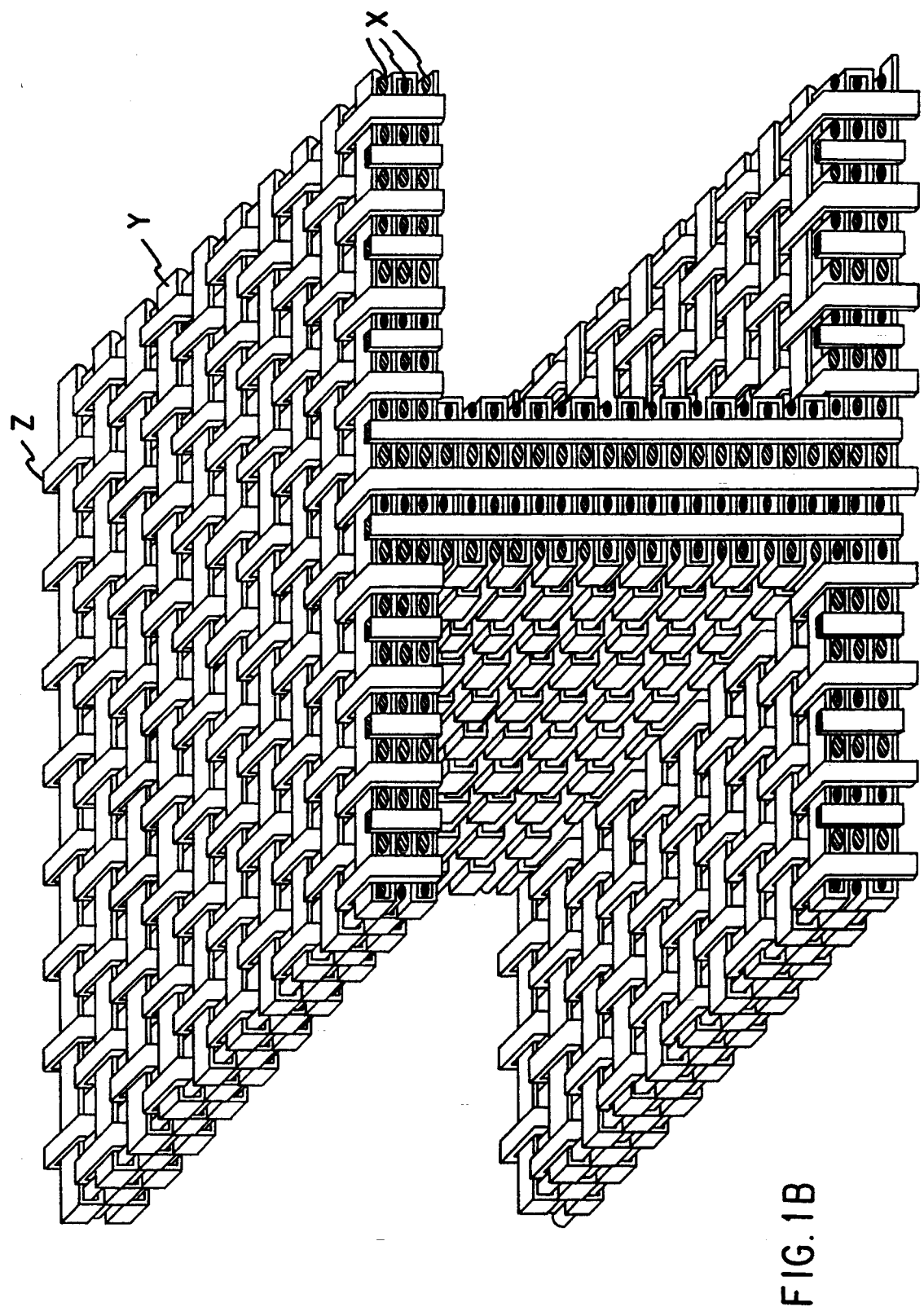
FIG. 1B is an enlarged perspective view, partly in section, of the fabric of FIG. 1A.
Figure 2C:
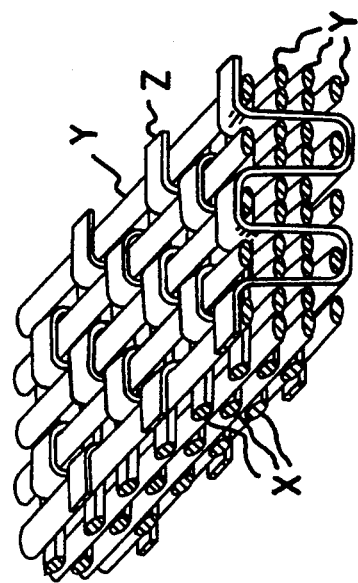
FIG. 2C is an enlarged perspective view, similar to FIG. 2B, in further section.
Figure 2B:
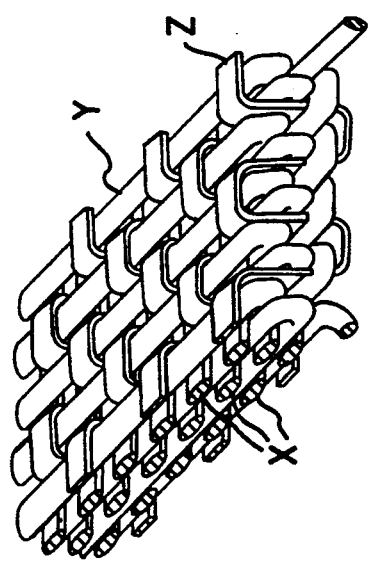
FIG. 2B is an enlarged perspective view, partly in section, of the fabric of FIG. 2A.
Figure 3B:
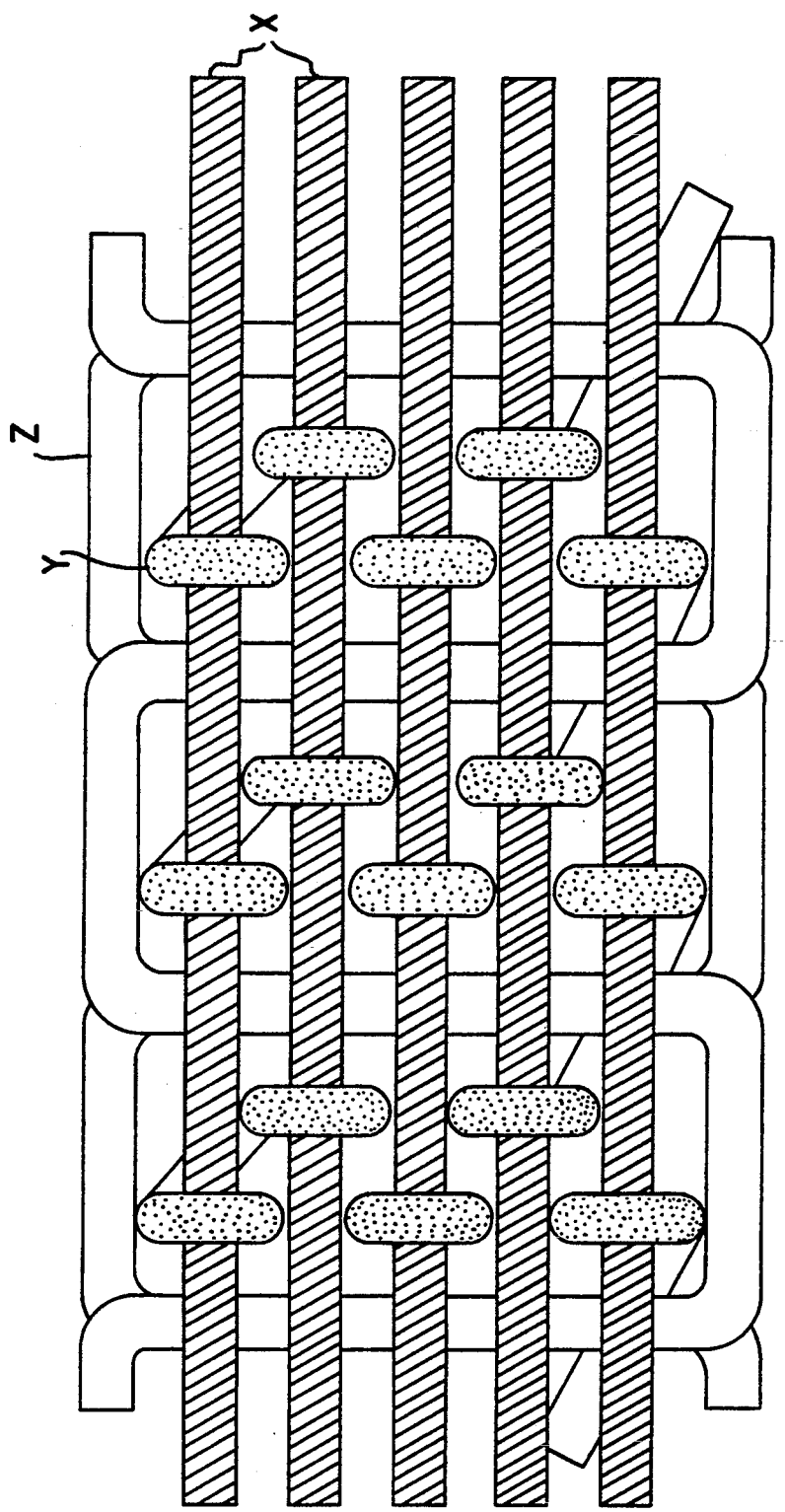
FIG. 3B is a partial plan view, to an enlarged scale, of the fabric structure of FIG. 3A.
Figure 3C:
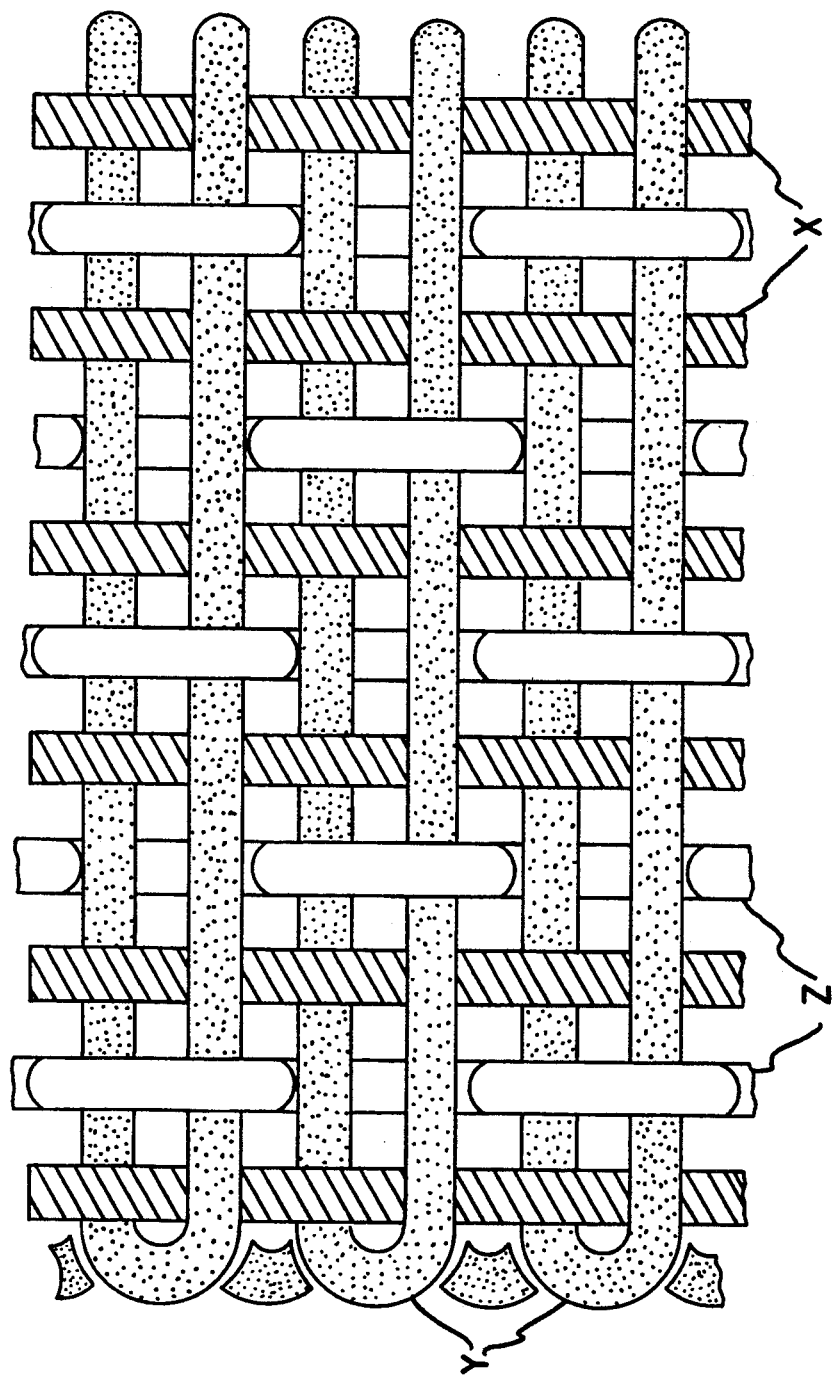
FIG. 3C is a top view, to an enlarged scale, of the fabric structure of FIG. 3A.

FIGS. 1A and 1B are an example of an I-section comprising a vertical portion A in the middle of horizontal portions B, C, D and E at the left and right of the upper and lower opposite ends of vertical portion A. Longitudinal filaments X, in horizontal planes of different lengths, are disposed in the portion A in four vertical rows. In the upper left horizontal portion B, upper right horizontal portion C, lower left horizontal portion D and lower right horizontal portion E, longitudinal filaments X are disposed in three layers each. The transverse filament Y moves downward while transversely reciprocating, horizontally, over the entire width across the upper right horizontal portion C, the portion above the vertical portion A and the upper left horizontal portion B, then moves downward, while horizontally reciprocating over the narrower width of the middle portion of the vertical portion A, further moves downward while horizontally reciprocating over the entire width across the lower right horizontal portion E, the portion below the vertical portion A and the lower left horizontal portion D. Transverse filament Y then passes to the back of the paper from one end of the lower left horizontal portion D, and is inserted to extend side by side in the same space with the portion of the transverse filament Y confined between upper and lower adjacent longitudinal filaments X and between adjacent vertical filaments Z, inserted during the downward travel, and moves upward while transversely reciprocating (see FIGS. 2A, 2B, 2C, 3A, 3B and 3C). On the other hand, the vertical filaments Z are disposed each between adjacent longitudinal filaments X in each of the upper and lower left and right horizontal portions B, C, D and E. Each time the transverse filament Y makes one vertical reciprocating travel, while moving in zigzags, adjacent vertical filaments Z move vertically, in mutually opposite directions, to clamp the transverse filaments Y in the vertical portion A and horizontal portions B, C, D, and E. The transverse filaments Y, in turn, clamp the longitudinal filaments X. This procedure is repeated until a three-dimensional woven fabric of I-shaped cross-section is woven.

Thus, as shown in FIGS. 2A, 2B, and 2C and 3A, 3B, and 3C, an even number of transverse filaments Y are inserted in each transverse space surrounded by vertically adjacent longitudinal filaments X and adjacent vertical filaments Z, while one or a plurality of transverse filaments Y are inserted into each loop defined by adjacent vertical filaments Z above the uppermost layer and below the longitudinal filaments X in the lowermost layer. In addition, in the case where there is a portion which is narrow, a locking filament T, see FIGS. 4A and 4B, is disposed along one transverse edge in the cross-section, and the turned end of the transverse filament is wrapped around such locking filament.

Figure 4A:
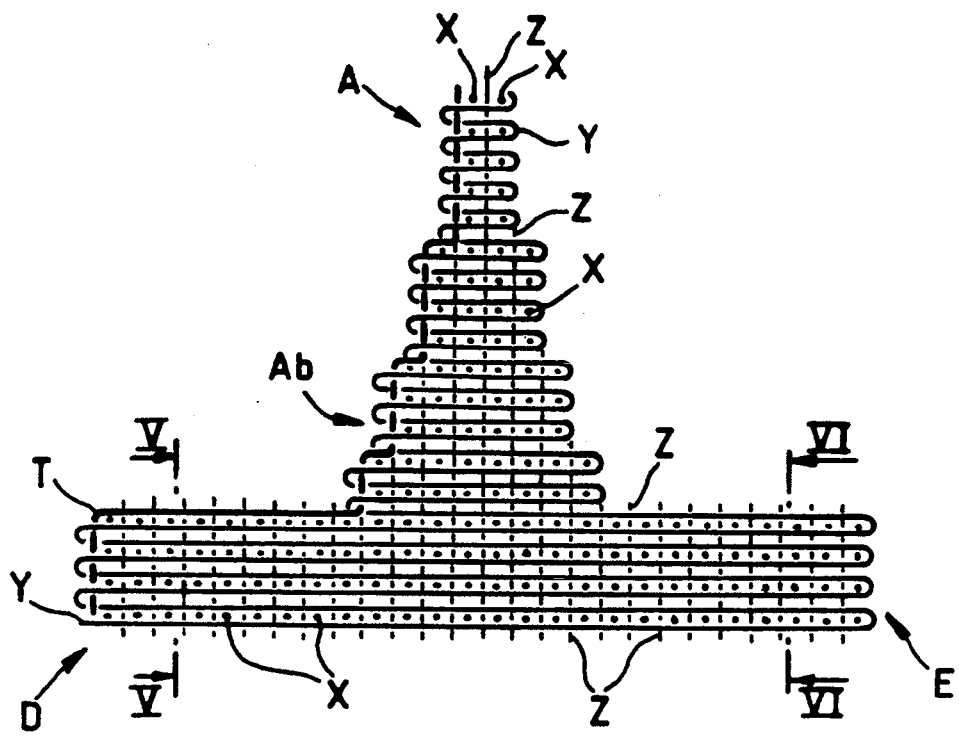
FIG. 4A is a cross-sectional view of the principal portion of another embodiment of the invention.
Figure 5:
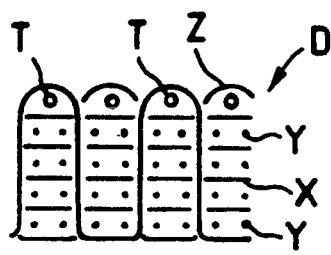
FIG. 5 is a sectional view taken along the line V—V in FIG. 4A.
Figure 6:
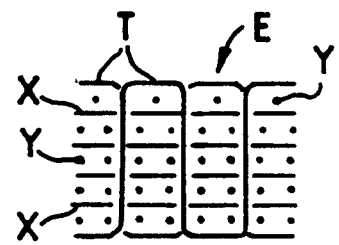
FIG. 6 is a cross-sectional view taken along the line VI—VI in FIG. 4A.
Figure 4B:
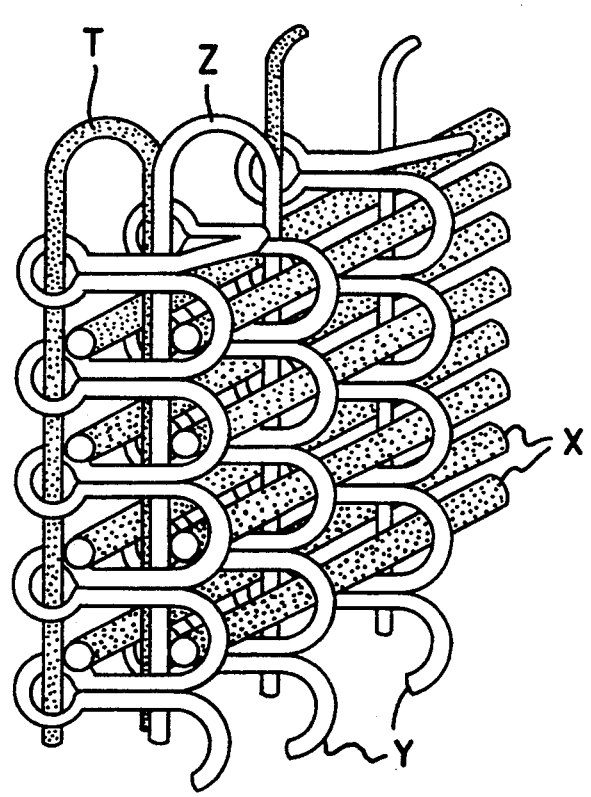
FIG. 4B is an enlarged perspective view of the portion of the fabric designated A in FIG. 4A.

FIGS. 4A, 4B, 5 and 6 show an example in which the width of the portion, where the vertical portion A intersects the horizontal portions D and E, is increased, stepwise for reinforcement, while a locking filament T is added. That is, longitudinal filaments X are disposed in two rows in the main body (upper end, as seen in FIG. 4A) of the vertical portion A and successively in four rows, six rows and eight rows, therebelow, thus forming a staircase-like portion Ab. Then the lower left and right horizontal portions D and E of four layers are formed. The transverse filament Y, inserted from the left and below the longitudinal filaments X in the lowermost layer, is inserted from the lower right into a shed which is one layer above, and upon reaching the left end, is wrapped around the locking filament T and then inserted into the same shed in the opposite direction. This procedure is repeated for weaving so that the transverse filament Y moves in zigzags and moves upward, while decreasing the zigzag width corresponding to the width of disposition of longitudinal filaments X. Each time the filament Y makes one reciprocating travel, it engages the locking filament T at the left end and, when it reaches the uppermost layer, the transverse filament Y changes direction for downward movement and the locking filament T is turned downward.

In the embodiment shown in FIGS. 1A and 1B, if the lower horizontal portions D and E are omitted, a T-shaped three-dimensional woven fabric is obtained; if the upper left and right horizontal portions B and C and lower left horizontal portion D are omitted, an L-shaped three-dimensional woven fabric is obtained; and, if the upper and lower left horizontal portions B and D are omitted, a U-shaped three-dimensional woven fabric is obtained. And in these "I", "T", "L" and "U" shaped three-dimensional woven fabrics, a staircase-like portion Ab, as shown in FIGS. 4A and 4B, can be provided inside the intersection between the vertical portion A and horizontal portions B, C, D and E to reinforce the intersection. Further, in the embodiment of FIGS. 4A and 4B, the locking filament T may be disposed only in the narrow portion of the width of disposition of longitudinal filaments X or may be disposed throughout the height. Further, in the embodiments shown in FIGS. 1 through 6, a single transverse filament Y has been vertically reciprocated throughout the height, while transversely reciprocating. However, the transverse filament may be locally changed. For example, in the I-shaped three-dimensional woven fabric of FIGS. 1A and 1B, it is possible to use a first transverse filament Y to weave the upper left horizontal portion B, the upper end of the vertical portion A and the upper right horizontal portion C, a second transverse filament Y to weave the middle portion of the vertical portion A and a third transverse filament Y to weave the lower left horizontal portion D, the lower end of the vertical portion A and the lower right horizontal portion E.

Figure 7:
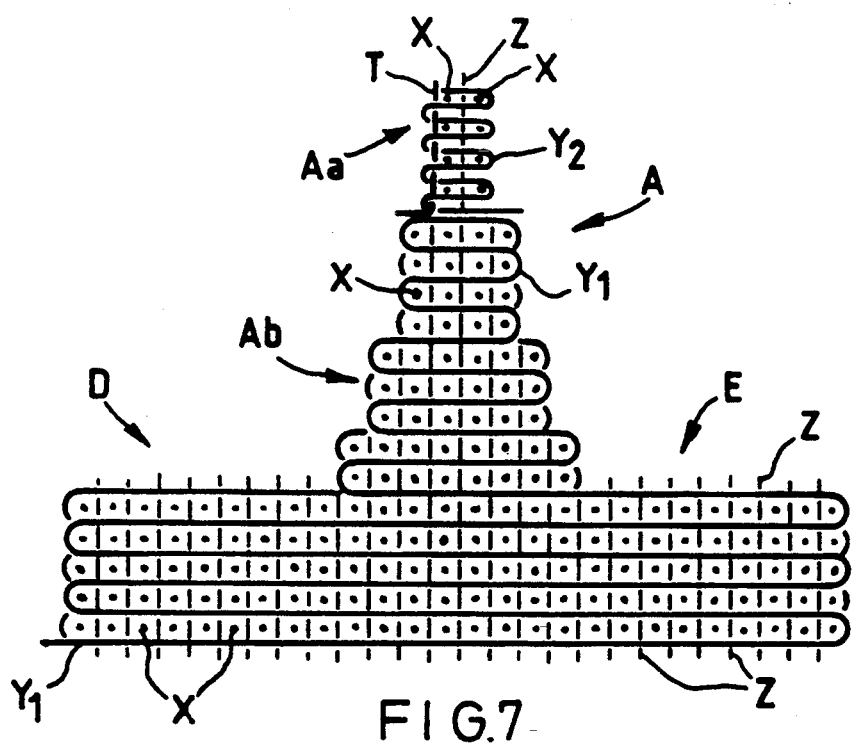
FIG. 7 is a cross-sectional view of the principal portion of still another embodiment.
Figure 8:
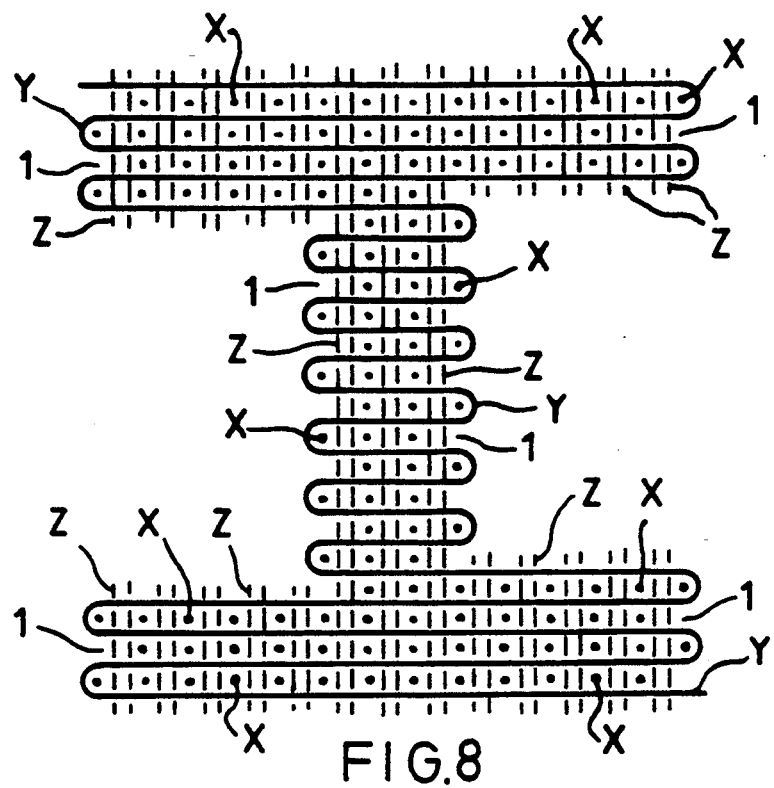
FIGS. 8 and 9 are cross-sectional, views of prior art examples.
Figure 8A:
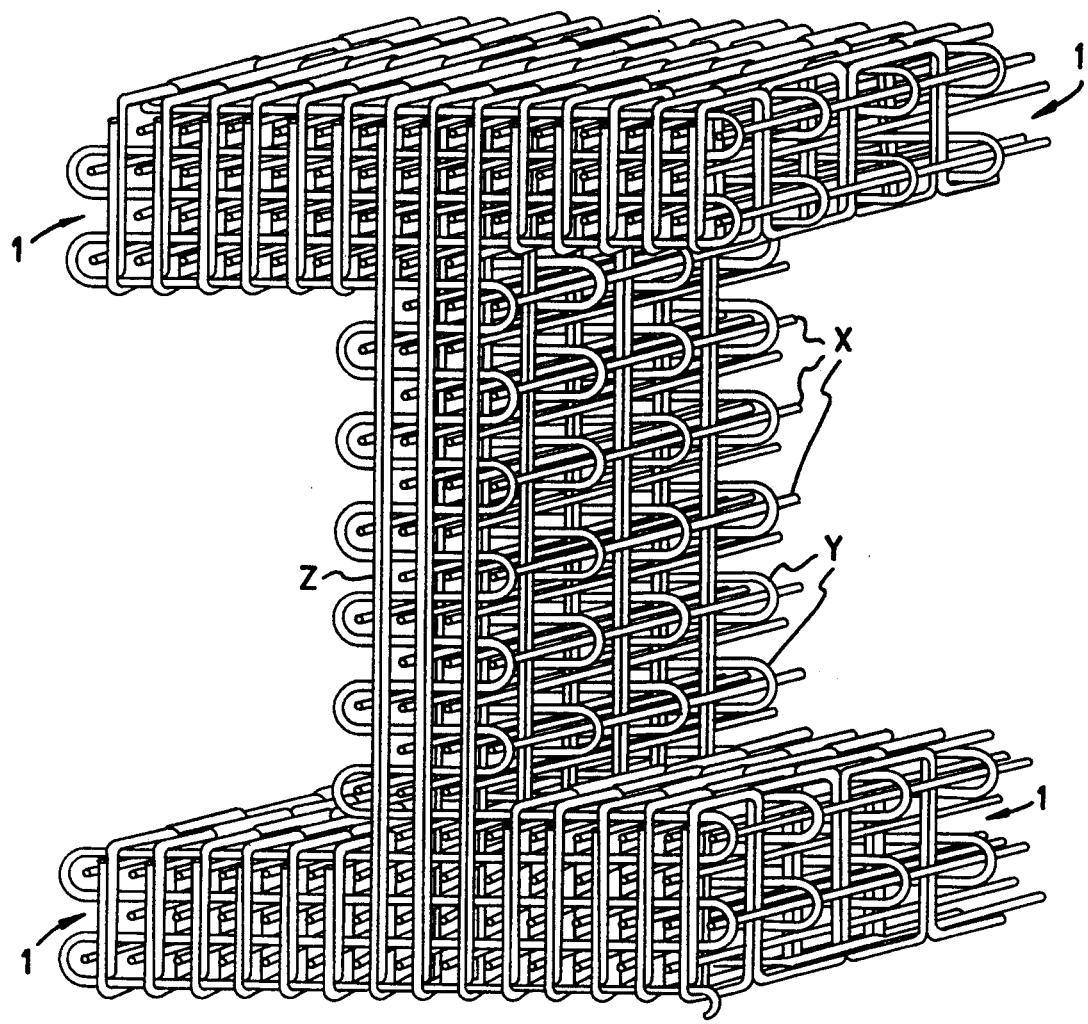
FIG. 8A is an isometric view of the fabric of FIG. 8.
Figure 9:
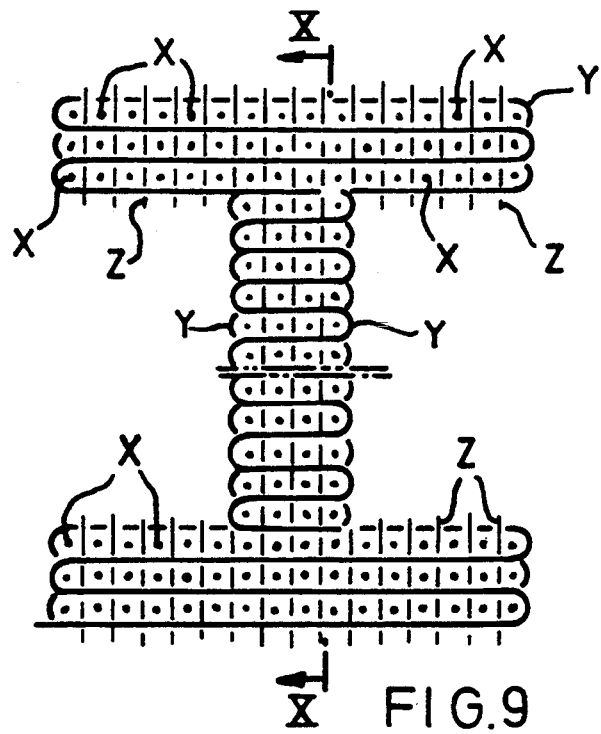
Figure 10:
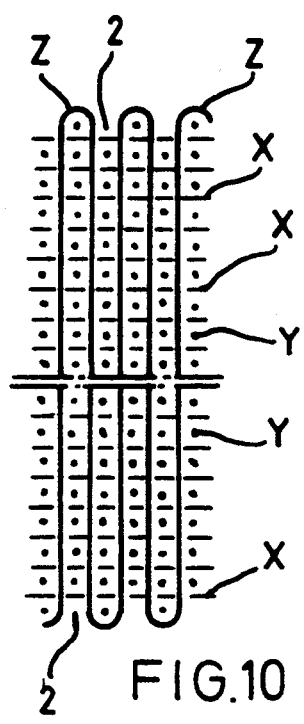
FIG. 10 is a sectional view taken along the line X—X in FIG. 9.
Figure 11:
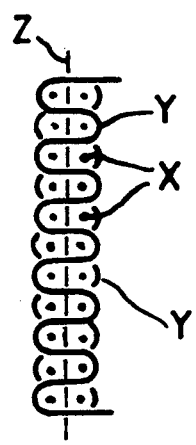
FIG. 11 is a sectional view of a narrow vertical portion in FIG. 9.

FIG. 7 shows an example in which the width of the portion where the vertical portion A intersects the horizontal portions D and E is stepwise increased for reinforcement, and a locking filament T is disposed in the narrow portion of the vertical portion A, while using a transverse filament Y2 in such narrow portion different from a transverse filament Y1 in another portion. That is, longitudinal filaments X are disposed in two rows in the narrow portion of the vertical portion A which is to become the main body Aa, below which is disposed a staircase-like portion Ab disposed in four rows, six rows and eight rows, respectively. Transversely extending lower left and right horizontal portions D and E are formed each in five layers. The transverse filament Y1, inserted from the left below the longitudinal filaments X, in the lowermost layer, moves upward while transversely reciprocating over the entire width across the horizontal portions D and E and staircase-like portion Ab, passes from the upper right of the staircase-like portion Ab to the back of the paper disposed one layer below, is inserted to extend side by side with the portion of transverse filament Y1 inserted during the upward travel, moves downward, while transversely reciprocating on the side associated with the back of the paper, and reaches the left end of the upper surface of the longitudinal filament E in the lowermost layer of the lower left horizontal portion D. On the other hand, the transverse filament Y2, forming the main body Aa of the vertical portion, is inserted from the right side of the lowermost layer of the main body Aa and reaches the left end, whereupon it is wrapped around the locking filament T and inserted into the same shed in the opposite direction. With this procedure repeated, filament Y2 moves upward and, each time it makes one reciprocating travel in the transverse direction, filament Y2 is woven as it engages the locking filament T at the left end. When filament Y2 reaches the uppermost layer, its movement changes to a downward zigzag movement and it moves downward while engaging the locking filament likewise turned downward.

According to the invention, the number of transverse and vertical filaments, disposed along longitudinal filaments, is 1-2 at the turns in the uppermost and lowermost layers, and in the other regions two (2) longitudinal filaments alternate with one vertical filament. As a result, there is no longer formed a longitudinal or transverse groove which had heretofore been formed in the lateral surfaces, or upper and lower surfaces, of a three-dimensional woven fabric; therefore, there is no possibility of a resin reservoir being formed to cause microcracks. Furthermore, long sized articles can be easily produced. In the case where a locking filament is passed through a turn on one side of a transverse filament disposed in one cross-section, owing to tension in the transverse filament, the narrow portion of the width of disposition of longitudinal filaments is prevented from being vertically elongated. Further, in the case where two or more transverse filaments are used, the strength and texture can be locally changed and a locking filament can be disposed only in a desired location.

Figure 12:
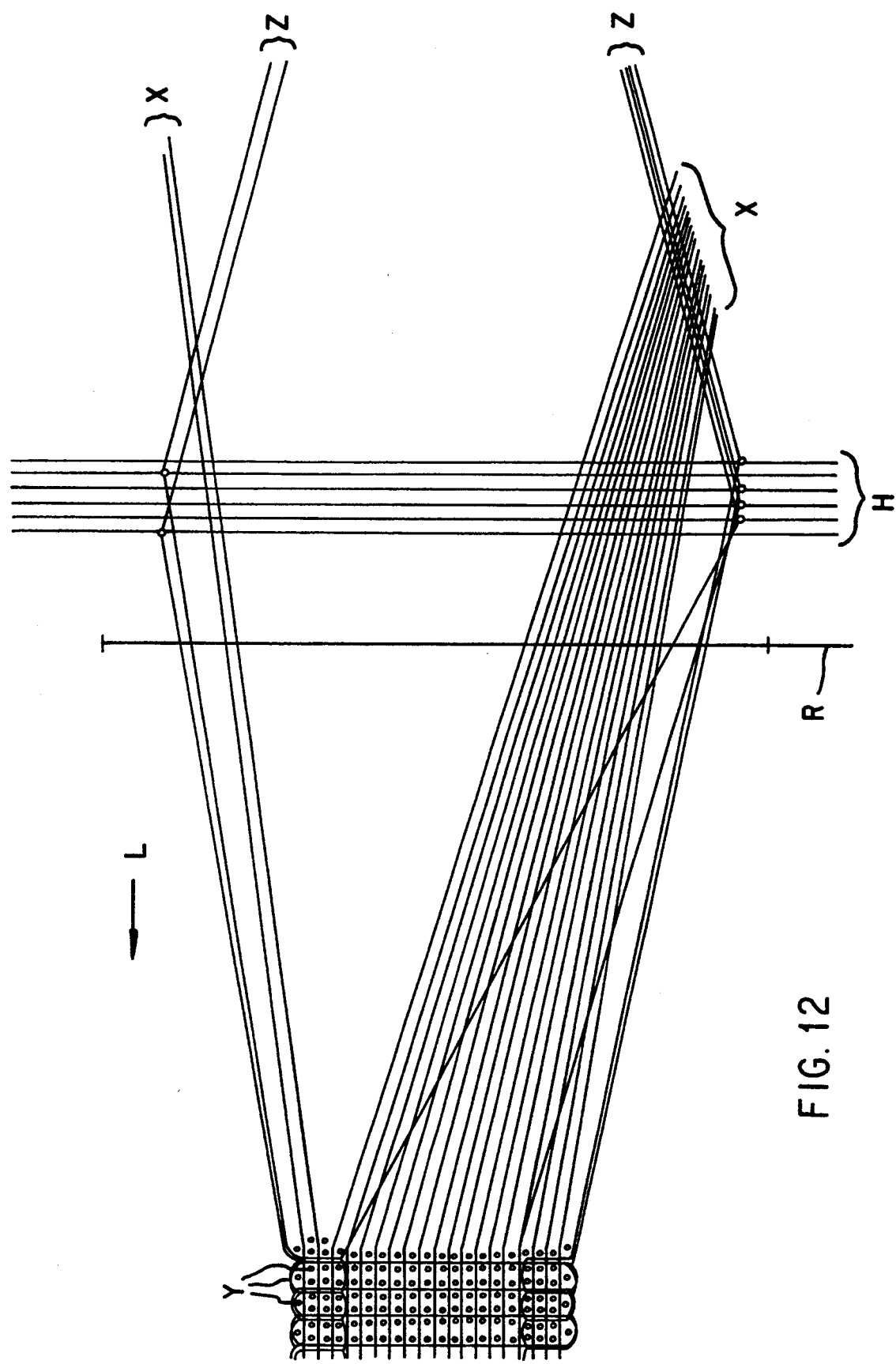
FIG. 12 is a diagrammatic side view of a weaving machine for producing the fabric of the instant invention.

A weaving machine suitable for weaving the type of fabric described above is diagrammatically shown in FIG. 12. In such machine, longitudinal filaments X are reciprocated through paths upwardly and downwardly across the fabric being woven as the transverse filaments Y are inserted therebetween in horizontally reciprocating, vertically progressing paths moving in zigzags, adjacent vertical filaments Z disposed between adjacent longitudinal filaments X, all of which is accomplished by the manipulation of the needle H and reed R, see FIG. 12, and the feed of X and Y filaments therethrough to loom L where such filaments are woven, three-dimensionally, with transverse filaments Y.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:

1. A profiled cross-section three-dimensional woven fabric having a plurality of mutually intersecting longitudinal, transverse and vertical filaments woven in longitudinal, transverse and vertical planes, said transverse planes being of differing width and said vertical planes being of differing height within a cross-section of said woven fabric perpendicular to said longitudinal woven filament planes, a woven filament in said transverse filament planes moving from one transverse plane to the next transverse plane after reciprocating transversely the longitudinal filaments in the width of the longitudinal plane traversed, a woven filament in said vertical woven filament planes moving from one vertical plane to the next vertical plane after reciprocating vertically the longitudinal filaments in the height of the vertical plane traversed, said transversely woven filament and said vertically woven filament clamping said longitudinal filaments, uniting all of said woven filaments together into a profiled cross-section three-dimensional woven fabric, wherein said woven fabric comprises a plurality of portions including at least an upper portion, a middle portion and a lower portion and is characterized in that an even number of transverse filaments are included in each transverse plane of at least one of said upper, middle and lower portions between longitudinal filaments in said longitudinal planes and transversely between adjacent vertical filaments in said vertical planes, and at least one of said filaments is included in a loop formed by adjacent vertical filaments above the longitudinal filaments in the uppermost longitudinal plane and below the longitudinal filaments in the lowermost longitudinal plane.

2. A profiled cross-section three-dimensional woven fabric having a plurality of mutually intersecting longitudinal, transverse and vertical filaments woven in longitudinal, transverse and vertical planes, said transverse planes being of differing width and said vertical planes being of differing height within a cross-section of said woven fabric perpendicular to said longitudinal woven filament planes, a woven filament in said transverse filament planes moving from one transverse plane to the next transverse plane after reciprocating transversely the longitudinal filaments in the width of the longitudinal plane traversed, a woven filament in said vertical woven filament planes moving from one vertical plane to the next vertical plane after reciprocating vertically the longitudinal filaments in the height of the vertical plane traversed, said transversely woven filament and said vertically woven filament clamping said longitudinal filaments, uniting all of said woven filaments together into a profiled cross-section three-dimensional woven fabric, said fabric being characterized in that grooves are formed in surfaces of said woven fabric in portions wherein single filaments are included in transverse planes between longitudinal filaments in said longitudinal planes and between adjacent filaments in said vertical planes, the fabric having at least a portion wherein such grooves are eliminated by inclusion of an even number of transverse filaments in each transverse plane of such portion between longitudinal filaments in longitudinal planes of said portion and transversely between adjacent vertical filaments in said vertical planes, and at least one of said filaments is included in a loop formed by adjacent vertical filaments above the longitudinal filaments in the uppermost longitudinal plane and below the longitudinal filaments in the lowermost longitudinal plane.

3. A profiled cross-section three-dimensional fabric according to claim 2 wherein an even number of filaments are included in each transverse plane of at least one of an upper, a middle and a lower portion of said woven fabric to eliminate grooves in surfaces of said at least one portion of the fabric, a single filament being included in transverse planes of other portions of said fabric.

4. A profiled cross-section three-dimensional fabric according to claim 3, wherein an even number of transverse filaments are included in said lower portion of said woven fabric, and a single filament is included in a portion of said fabric above said lower portion.

5. A profiled cross-section three-dimensional fabric according to claim 4, wherein at least one of said even number of transverse filaments in said lower portion is included in a loop formed by adjacent vertical filaments below the longitudinal filaments in the lower most longitudinal.

6. A profiled cross-section three-dimensional fabric according to claim 3, wherein a locking filament is disposed along one transverse lateral end edge in a cross-section of said upper portion of said fabric and the portion of said woven transverse filament moving from one transverse plane to the next transverse plane extends around said locking filament.

7. A profiled cross-section three-dimensional woven fabric having a plurality of mutually intersecting longitudinal, transverse and vertical filaments woven in longitudinal, transverse and vertical planes, said transverse planes being of differing width and said vertical planes being of differing height within a cross-section of said woven fabric perpendicular to said longitudinal woven filament planes, a woven filament in said transverse filament planes moving from one transverse plane to the next transverse plane after reciprocating transversely the longitudinal filaments in the width of the longitudinal plane traversed, a woven filament in said vertical woven filament planes moving from one vertical plane to the next vertical plane after reciprocating vertically the longitudinal filaments in the height of the vertical plane traversed, said transversely woven filament and said vertically woven filament clamping said longitudinal filaments, uniting all of said woven filaments together into a profiled cross-section three-dimensional woven fabric, said fabric being characterized in that grooves are formed in surfaces of at least one portion of said woven fabric wherein single filaments are included in transverse planes of said at least one portion between longitudinal filaments in said longitudinal planes and between adjacent filaments in said vertical planes, the fabric having at least another portion wherein such grooves are eliminated by inclusion of an even number of transverse filaments in each transverse plane of said another portion between longitudinal filaments in longitudinal planes of said another portion and transversely between adjacent vertical filaments in said vertical planes, and at least one of said filaments is included in a loop formed by adjacent vertical filaments above the longitudinal filaments in the uppermost longitudinal plane and below the longitudinal filaments in the lowermost longitudinal plane.

* * * * *